United States Patent [19]
Mary

[11] 4,190,129
[45] Feb. 26, 1980

[54] AIR CUSHION BUMPER CARS

[76] Inventor: Dominique Mary, lieu dit "La Souche", 76500 Elbeuf, France

[21] Appl. No.: 904,343

[22] Filed: May 9, 1978

[30] Foreign Application Priority Data

May 18, 1977 [FR] France ................................ 77 16223

[51] Int. Cl.² .............................................. B60V 1/14
[52] U.S. Cl. ................................... 180/119; 180/214; 180/252; 280/239; 280/43.14
[58] Field of Search ...................... 180/119, 2; 280/239

[56] References Cited
U.S. PATENT DOCUMENTS

| | | | |
|---|---|---|---|
| 2,615,727 | 10/1952 | Bancroft | 280/239 X |
| 3,227,234 | 1/1966 | Simon | 180/119 |
| 3,398,809 | 8/1968 | Wood | 180/119 |
| 3,829,116 | 8/1974 | Burdick | 180/119 |
| 4,063,611 | 12/1977 | Anderson | 180/119 |

*Primary Examiner*—John P. Silverstrim
*Attorney, Agent, or Firm*—William A. Drucker

[57] ABSTRACT

A vehicle supported by an air cushion comprises three wheels arranged along a longitudinal axis of a chassis. The front and rear wheels can pivot through 360° and are always driven in the same direction. The center wheel has a fixed axle and is idler-mounted. A steering wheel controls the simultaneous and identical orientation of the front and rear wheels, while pedals control the lifting of the wheels in relation to the ground, according to predetermined combinations.

5 Claims, 6 Drawing Figures

AIR CUSHION BUMPER CARS

BACKGROUND OF THE INVENTION

The invention relates to fairground cars known as "bumper cars".

In the French patent filed on 21st May 1974 under No. 74.18010 in the same of Dominique MARY for "Bumper cars on an air cushion" the application to this type of vehicle of the known technique of support on an air cushion has been described. Said patent is mainly characterised in that the propulsion and steering functions of the vehicle are completely independent of the support function and are exercised solely by at least two wheels associated with driving members and means for lifting and application to the ground when the vehicle is in motion, mechanisms controlled by the driver making it possible to act on the wheels to steer the vehicle in a wide variety of movements.

The preferred embodiment described in the above patent provides for two wheels, aligned along a transversal axis, which can be raised simultaneously, driven in the same direction or in the opposite direction to each other and whose speeds can vary in opposite directions.

OBJECT OF THE INVENTION

The object of the present invention is to provide another embodiment which simplifies the electrical layout controlling the driving members by eliminating the reversal of the direction of rotation and the speed variation and increases still further the variety of movements obtained.

SUMMARY OF THE INVENTION

According to the invention, the vehicle comprises three wheels arranged along the longitudinal axis of the chassis, one such wheel, i.e. the middle one, being an idler and having a fixed axle at right angles to said longitudinal axis and the other two front and rear wheels being driving wheels which are driven in one direction only and have axles which can be orientated simultaneously in any same direction in the plane defined by the above two axles, one at least of the two front and rear wheels being capable of being applied in engagement with the ground independently or in combination with any one of the other two.

In a more specific form of embodiment, the front wheel can be lifted independently or in combination with any one of the other two, while the rear wheel can only be lifted in combination with any one of the other two.

A better understanding of the invention will be obtained from the following description.

DESCRIPTION OF THE PREFERRED EMBODIMENT

Figure 1:
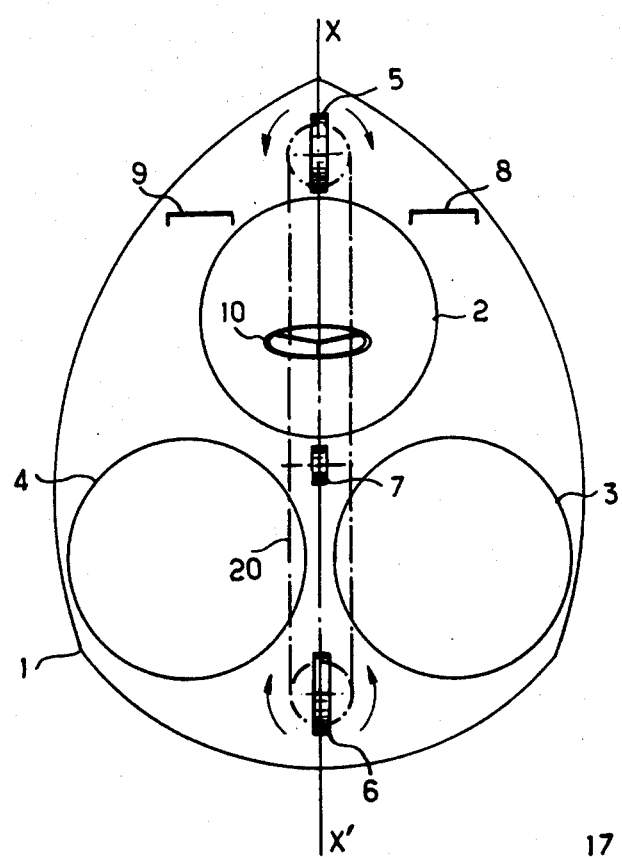
FIG. 1 is a diagrammatic plan view of a vehicle according to the invention.

FIG. 1 shows, diagrammatically, the chassis of the vehicle, with its longitudinal axis X'X. This chassis carries three suction cups 2, 3, 4 supplied simultaneously by a single powered fan (not shown) via pipes of the same diameter and the same length producing a pressure drop with a clearly defined value.

Along axis X'X there are mounted a front wheel 5 and a rear wheel 6, whose axles can pivot through 360° around X'X in a plane parallel with the ground, and a centre idler wheel 7 whose axle is fixed and at right-angles to X'X. Pedals 8 and 9 control the release or lifting of the wheels according to certain combinations by operating mechanisms which will be described later herein. A steering wheel 10 controls the simultaneous orientation of wheels 5 and 6 by operating mechanisms which will be described later herein.

Figure 2:
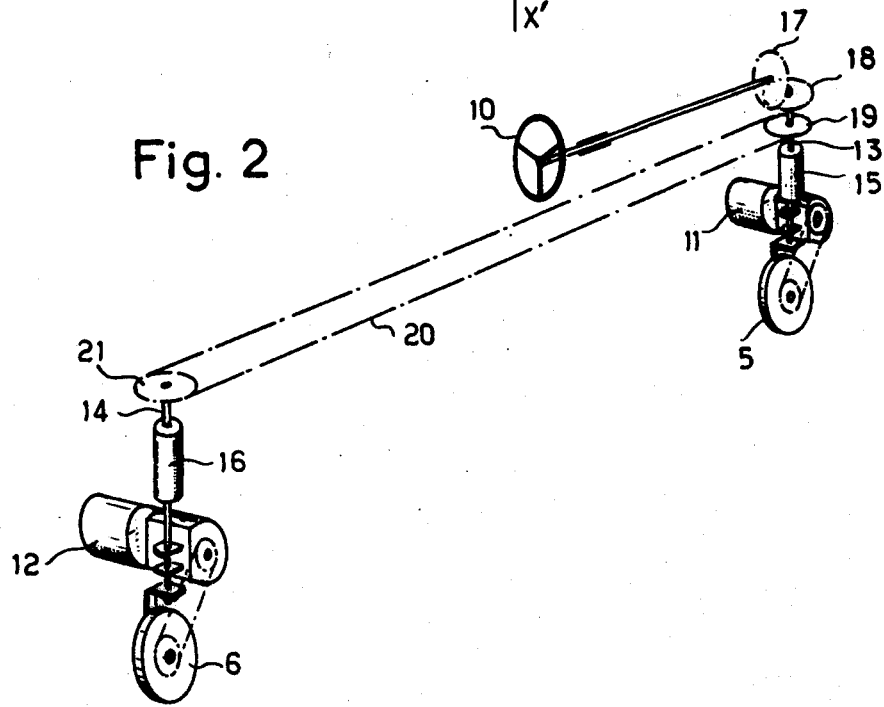
FIG. 2 shows the two step-down gears and their connection to the steering wheel.

Wheels 5 and 6 respectively are rotated, always in the same direction, by two step-down gears shown at 11 and 12 in FIG. 2. These gears, as well as wheels 5 and 6, are respectively mounted on two vertical axles 13 and 14 which themselves cooperate with bearings 15 and 16 connected to the chassis so that each unit can pivot around these vertical axles, controlled by steering wheel 10. The latter controls axle 13 via a vertical pinion 17 engaging with a horizontal wheel 18. A second wheel 19, integral with axle 13 drives a wheel 21 mounted on axle 14 by means of a chain 20.

Wheels 5 and 6, in the released position, only adhere to the ground by the effect of the weight of the step-down gear, the air cushion being adjusted to support the rest of the vehicle and its load. The idler wheel 7, in the released position, adheres to the ground by the effect of a spring 45 which presses on lever 34 described later herein (FIG. 3).

Figure 3:
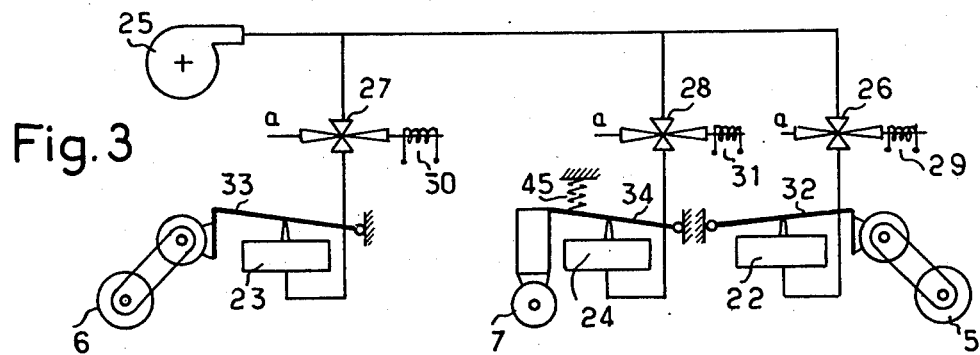
FIG. 3 is a control diagram of the mechanism lifting the wheels.

FIG. 3 shows air chambers 22, 23, 24 which respectively control the lifting of the units comprising wheels 5, 6 and 7.

These air chambers are supplied by a fan 25, advantageously, the one on the powered fan unit, via electromagnetic valves 26, 27, 28 respectively controlled by coils 29, 30, 31.

Each air chamber, when it is supplied, lifts a lever 32, 33, 34 articulated at its fixed end, which itself lifts the corresponding step-down gear.

When the electromagnetic valves are closed, the compressed air is connected to exhaust a.

Figure 4:
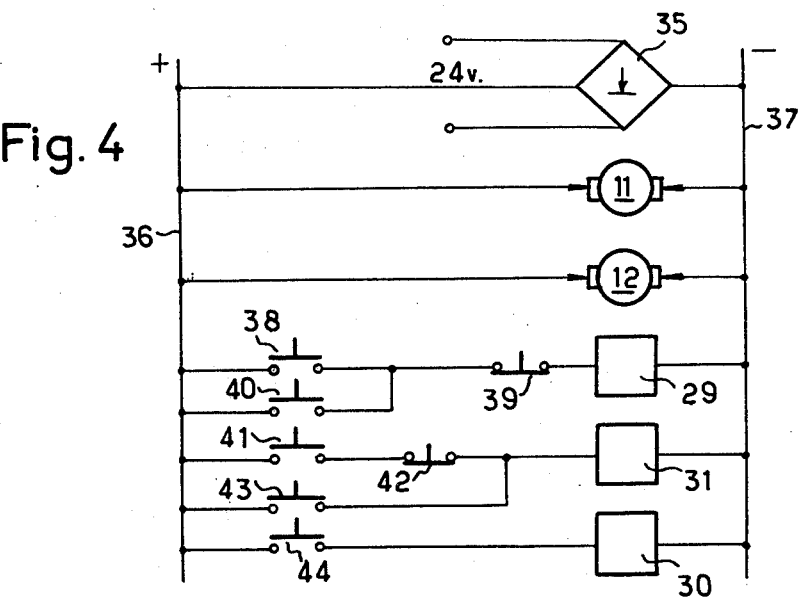
FIG. 4 is a diagram of the supply and control electric circuit.

FIG. 4 shows the supply circuit to the D.C. motors of gears 11 and 12 and coils 29 to 31. This circuit includes a diode rectifier bridge 35 supplied with 24-volt single-phase alternating current and, between the two direct current supply wires 36 and 37, the following are mounted in parallel, in addition to the motors:

a first unit comprising, in series, contacts 38-39 and coil 29; a contact 40 is mounted in parallel on contact 38;

a second unit comprising, in series, contacts 41-42 and coil 31; a contact 43 is mounted in parallel on contact 41;

a third unit comprising, in series, a contact 44 and coil 30.

Pedal 8 (FIG. 1) drives a cam (not shown) which, when the pedal is not being operated, does not act on any contact; in a first operating position (intermediate depression) it closes contacts 40 and 41 and in a second position (full depression) it closes contacts 40-41 and opens contact 42.

Pedal 9 (FIG. 1) drives a cam (not shown) which, when the pedal is not being operated, does not act on any contact; in a first operating position, it closes contacts 38 and 44 and in a second position it closes contacts 38-44 and 43 and opens contact 39.

If no pedal is depressed, the contacts are in the position shown in FIG. 4, no coil is excited and the three electromagnetic valves are open: the three wheels are thus in a raised position.

If pedal 8 only is depressed to the first position, coils 29 and 31 are excited and wheels 5 and 7 are therefore released and put in contact with the ground.

If pedal 8 only is depressed to the second position, coil 29 is excited and only wheel 5 is put in contact with the ground.

If pedal 9 only is depressed to the first position, coils 29 and 30 are excited and wheels 5 and 6 are put in contact with the ground.

If pedal 9 only is depressed to the second position, coils 30 and 31 are excited and wheels 6 and 7 are put in contact with the ground.

It will be noted (FIG. 4) that both motors 11 and 12 are permanently supplied in the same direction, which simplifies the wiring diagram.

Steering of the vehicle, both forward and in reverse, is obtained by operating the steering wheel and the two pedals.

Figure 5:
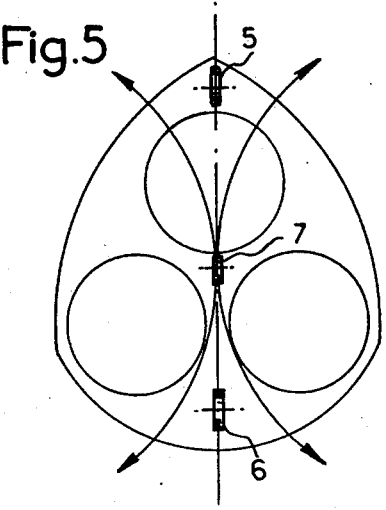
FIGS. 5 and 6 show some of the movements which the vehicle can make.

When wheels 5 and 7 are in contact with the ground, the usual movements shown by the arrows, FIG. 5, can be obtained. For example, reverse movement turning to the right or the left is obtained by orientating wheel 5 towards the rear, then by slanting it slightly in the appropriate direction. The combination of wheels 7 and 6 gives the same movements with reverse turns of the steering wheel.

With these combinations it is, moreover, possible to make the vehicle turn on itself, in one direction or the other, by slanting wheel 5 suitably.

When wheel 5 only is in contact with the ground, if it is orientated to change direction, the centrifugal force will tend to push the vehicle towards the outside of its course, causing a tail skid.

Figure 6:
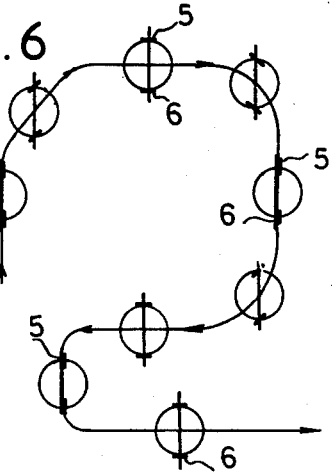

The combination of wheels 5 and 6 enables very sinuous movements to be made, like the one shown in FIG. 6, in which the average direction of movement of the vehicle remains constant, while lateral movements are made.

When there is no contact between the wheels and the ground (pedals not depressed), the vehicle only moves by virtue of acquired kinetic energy or by striking obstacles.

If the vehicle is impeded, the wheels may spin and for this reason, they are fitted with a particularly wear-resistant tyre.

It goes without saying that the combinations described relating to the wheels in contact with the ground are not limiting, nor are the means described for achieving them.

I claim:

1. A ground effect vehicle comprising: a chassis having a longitudinal axis; front, middle and rear wheels arranged along the said longitudinal axis and each having an axle, the axle of said middle wheel being fixed at right angles to the said axis and the said middle wheel being an idler wheel; means for pivoting the axles of the front and rear wheels to orientate the said axles simultaneously in any same direction in a plane containing the said axis and parallel with the ground; means for driving the front and rear wheels in one direction; air cushion means carried by the chassis for exerting a downward force on the ground and an upward lift force on the chassis; means for lifting the said wheels off the ground and applying them in engagement with the ground without disturbing the attitude of the chassis while the vehicle is in motion, the said lifting means being so arranged that one at least of the two front and rear wheels is capable of being selectively applied in engagement with the ground independently or in combination with any one of the other two wheels.

2. A vehicle, according to claim 1, wherein the front wheel can be selectively applied in engagement with the ground independently and in combination with any one of the other two and the rear wheel can be selectively applied in engagement with the ground in combination with any one of the other two.

3. A vehicle, according to claim 1, wherein the said lifting means are adapted for achieving the following combinations:

all three wheels raised,
the front wheel only raised,
the middle wheel only raised,
the rear wheel only raised,
both the middle and rear wheels raised.

4. A vehicle, according to claim 1, said vehicle having a steering wheel, wherein the means for pivoting the axles of the front and rear wheels comprise gearings linking the said front and rear wheels to the steering wheel.

5. A vehicle, according to claim 1, wherein the said lifting means comprise first, second and third inflatable chambers, first, second and third levers each articulated at a fixed point and respectively cooperating with the first, second and third inflatable chambers, a source of compressed air, first, second and third conduits respectively including first, second and third electromagnetic valves each having a control coil and respectively connecting the said source to the first, second and third inflatable chambers; a source of electric supply for energizing the said coils, switching means including contact means for controlling the selective energization of said coils by said source of electric supply and two pedals, mounted in the vehicle and each having two operating positions, said pedals selectively actuating the said contact means.

* * * * *